United States Patent
Chen et al.

(10) Patent No.: US 7,180,274 B2
(45) Date of Patent: Feb. 20, 2007

(54) SWITCHING VOLTAGE REGULATOR OPERATING WITHOUT A DISCONTINUOUS MODE

(75) Inventors: Tien-Tzu Chen, Hsin-Chu (TW); Guang-Nan Tzeng, Hsin-Chu (TW)

(73) Assignee: Aimtron Technology Corp., Hsinchu (TW)

( * ) Notice: Subject to any disclaimer, the term of this patent is extended or adjusted under 35 U.S.C. 154(b) by 119 days.

(21) Appl. No.: 10/905,018

(22) Filed: Dec. 10, 2004

(65) Prior Publication Data

US 2006/0125454 A1  Jun. 15, 2006

(51) Int. Cl.
*G05F 1/595* (2006.01)
(52) U.S. Cl. ............... 323/222; 323/271; 323/284
(58) Field of Classification Search ........... 323/222, 323/225, 226, 270, 271, 282, 284
See application file for complete search history.

(56) References Cited

U.S. PATENT DOCUMENTS

| | | | |
|---|---|---|---|
| 5,481,178 A | 1/1996 | Wilcox et al. | 323/287 |
| 5,568,044 A | 10/1996 | Bittner | 323/272 |
| 6,310,469 B1 | 10/2001 | Bentolila et al. | 323/283 |
| 6,396,252 B1 | 5/2002 | Culpepper et al. | 323/285 |
| 6,538,418 B2 | 3/2003 | Miyazaki | 323/284 |
| 6,541,947 B1 | 4/2003 | Dittmer et al. | 323/284 |
| 6,580,258 B2 | 6/2003 | Wilcox et al. | 323/282 |
| 6,707,281 B2 | 3/2004 | Solivan | 323/225 |
| 6,724,174 B1 | 4/2004 | Esteves et al. | 323/224 |
| 6,747,441 B2 | 6/2004 | Johnson et al. | 323/282 |
| 6,788,033 B2 * | 9/2004 | Vinciarelli | 323/225 |
| 6,812,676 B2 * | 11/2004 | Tateishi | 323/225 |
| 6,815,939 B2 | 11/2004 | Umemoto et al. | 323/286 |
| 6,906,500 B2 * | 6/2005 | Kernahan | 323/225 |
| 6,977,488 B1 * | 12/2005 | Nogawa et al. | 323/271 |
| 7,006,362 B2 * | 2/2006 | Mizoguchi et al. | 363/16 |
| 7,042,203 B2 * | 5/2006 | Van Der Horn et al. | 323/285 |

OTHER PUBLICATIONS

"High-Efficiency, SOT23 Step-Down, DC—DC Converter", p. 1-18, SLVS417A-Mar. 2002 Revised Mar. 2002, Texas Instruments.

* cited by examiner

*Primary Examiner*—Jeffrey Sterrett
(74) *Attorney, Agent, or Firm*—Winston Hsu

(57) ABSTRACT

A switching circuit operates with a first operating state and a second operating state. During the first operating state, the switching circuit allows a switching current to linearly increase. During the second operating state, the switching circuit allows the switching current to linearly decrease. A control circuit is coupled to the switching circuit for controlling the switching circuit to operate with the first operating state or the second operating state. A setting circuit generates a threshold signal for the control circuit to ensure that during the first operating state the switching current linearly increases to become higher than or equal to a current value set by the threshold signal. Thereby, the switching current is prevented from linearly decreasing to reverse polarity during the second operating state.

19 Claims, 6 Drawing Sheets

SWITCHING VOLTAGE REGULATOR OPERATING WITHOUT A DISCONTINUOUS MODE

BACKGROUND OF THE INVENTION

1. Field of the Invention

The present invention relates to a switching voltage regulator and, more particularly, to a switching voltage regulator operating without a discontinuous mode for enhancing power delivery efficiency.

2. Description of the Related Art

Switching voltage regulators supply a required output current at a regulated output voltage to a load. Through controlling duty ratios of power transistors, the switching voltage regulator converts an unregulated input voltage source to a stable, desired output voltage. FIG. 1 is a circuit block diagram showing a conventional synchronous switching buck regulator with a current feedback control. As shown in FIG. 1, a high-side switch HS and a low-side switch LS are series-connected between an input voltage source $V_{in}$ and a ground potential. An inductor L has one end connected to a common node CN between the high-side switch HS and the low-side switch LS, and the other end serving as an output terminal for supplying an output voltage $V_{out}$ to a load $R_L$. The output terminal may be additionally provided with an output capacitor $C_o$ for filtering the output voltage $V_{out}$. The high-side switch HS and the low-side switch LS are controlled by a high-side drive signal HD and a low-side drive signal LD generated from the switching logic circuit 10, respectively. With respect to the synchronous switching voltage regulator, the high-side switch HS and the low-side switch LS are operated out of phase. An oscillating circuit 11 outputs a pulse signal PU having a fixed frequency to the switching logic circuit 10. In the beginning of each switch cycle, the switching logic circuit 10 turns on the high-side switch HS and turns off the low-side switch LS in response to the pulse signal PU. As a result, the input voltage source $V_{in}$ supplies energy to the inductor L for linearly increasing the current $I_L$. Once the inductor current $I_L$ reaches a upper limit set by a slope-compensated error signal $V_{err2}$ between a voltage feedback signal $V_{vfb}$ and a reference voltage signal $V_{ref}$, a comparator 12 is triggered to output HIGH instead of LOW. In response to the trigger event of the comparator 12, the switching logic circuit 10 turns off the high-side switch HS and turns on the low-side switch LS. As a result, the inductor current $I_L$ linearly decreases since the energy stored in the inductor L delivers to the load $R_L$.

FIG. 2 is a timing chart showing waveforms of the inductor current $I_L$ of the synchronous switching buck regulator of FIG. 1. As shown in FIG. 2, a curve 21 indicates a waveform of the inductor current $I_L$ with respect to a continuous-mode operation of the switching voltage regulator. Within each switch period $T_S$, the inductor current $I_L$ changes like a triangular wave having a linearly increasing portion corresponding to an operating state that the high-side switch HS is turned on for allowing the input voltage source $V_{in}$ to supply energy to the inductor L and a linearly decreasing portion corresponding to another operating state that the high-side switch HS is turned off for allowing the energy stored in the inductor L to deliver to the load $R_L$.

A curve 22 indicates a waveform of the inductor current $I_L$ with respect to a discontinuous-mode operation of the switching voltage regulator. At a time t1, a switch cycle begins and therefore the high-side switch HS is turned on for linearly increasing the inductor current $I_L$. At a time t2, the inductor current $I_L$ reaches a upper limit $I_{peak2}$ set by the slope-compensated error signal $V_{err2}$, causing the high-side switch HS to be turned off and the low-side switch LS to be turned on. Consequently, the inductor current $I_L$ starts to linearly decrease. At a time t3, the inductor current $I_L$ has already decreased to zero although the next switch cycle will not start until a time t4. In this case, the inductor current $I_L$ is subjected to polarity reversal between times t3 and t4, i.e. the flowing direction of the inductor current $I_L$ makes a change of 180 degrees. For this reason, the conventional synchronous switching buck regulator must be additionally provided with a current reversal detecting circuit 17, as shown in FIG. 1, for triggering the switching logic circuit 10 to turn off the low-side switch LS immediately after the inductor current $I_L$ decreases to zero. Thereby, the inductor current $I_L$ is prevented from reversing polarity to reduce the power delivery efficiency.

Even if the current reversal detecting circuit 17 is provided or the circuit topology is replaced with a non-synchronous switching type which uses a combination of the power transistor and a flywheel diode as the switching circuit, the inductor current $I_L$ is effectively prevented from reversing polarity. However, as shown in FIG. 2, the inductor current $I_L$ remains zero between the times t3 and t4 with respect to the discontinuous-mode operation. In this case, the output voltage $V_{out}$ inevitably rings or fluctuates up and down to cause unfavorable high-frequency noise.

SUMMARY OF THE INVENTION

In view of the above-mentioned problems, an object of the present invention is to provide a switching voltage regulator capable of being adapted to operate with the continuous mode, thereby avoiding the drawbacks caused by the discontinuous mode.

It is observed that if half the peak current flowing through the inductor is just equal to the average current flowing through the inductor, the switching voltage regulator operates at a threshold operating state between the continuous mode and the discontinuous mode. At such a threshold operating state, the peak current flowing through the inductor may be referred to as a threshold peak current of the continuous mode. Therefore, the switching voltage regulator according to the present invention is provided with a threshold peak current setting circuit for generating a threshold signal representative of the threshold peak current of the continuous mode. When the peak current flowing through the inductor is higher than the threshold peak current, it is unnecessary to adjust the inductor current since the continuous mode has been established. However, when the peak current flowing through the inductor is detected to be lower than the threshold peak current, the inductor current needs to be raised such that the peak current is substantially equal to the threshold peak current, thereby ensuring that the switching voltage regulator operates with the continuous mode.

According to one aspect of the present invention, a switching voltage regulator is provided to include a switching circuit, a control circuit, and a setting circuit. The switching circuit operates with a first operating state and a second operating state. During the first operating state, the switching circuit allows a switching current to linearly increase. During the second operating state, the switching circuit allows the switching current to linearly decrease. The control circuit is coupled to the switching circuit for controlling the switching circuit to operate with the first operating state or the second operating state. The setting circuit generates a threshold signal such that in response to the threshold signal the control circuit ensures that the switching current linearly increases to become higher than or equal to a current value set by the threshold signal during the first operating state. Thereby, the switching current is prevented from linearly decreasing to reverse polarity during the second operating state.

According to another aspect of the present invention, a method of controlling a switching voltage regulator is provided to include the following steps. A switching circuit is controlled to operate with a first operating state for allowing a switching current to linearly increase. The switching circuit is controlled to operate with a second operating state for allowing the switching current to linearly decrease. In the step of controlling the switching circuit to operate with the first operating state, the switching current is ensured to become higher than or equal to a threshold current. Thereby, the switching current is prevented from linearly decreasing to reverse polarity in the step of controlling the switching circuit to operate with the second operating state.

According to still another aspect of the present invention, a threshold current setting circuit is provided to include a first circuit, a second circuit, and a third circuit. The first circuit generates a first current signal in response to a voltage signal. The first current signal is proportional to the voltage signal. The second circuit generates a second current signal in response to the first current signal and a periodic signal. The second current signal is representative of a periodically-varying current. The third circuit generates a third current signal representative of a predetermined current value. A combination of the first to the third current signals is used to approximately simulate a threshold current signal.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 1:
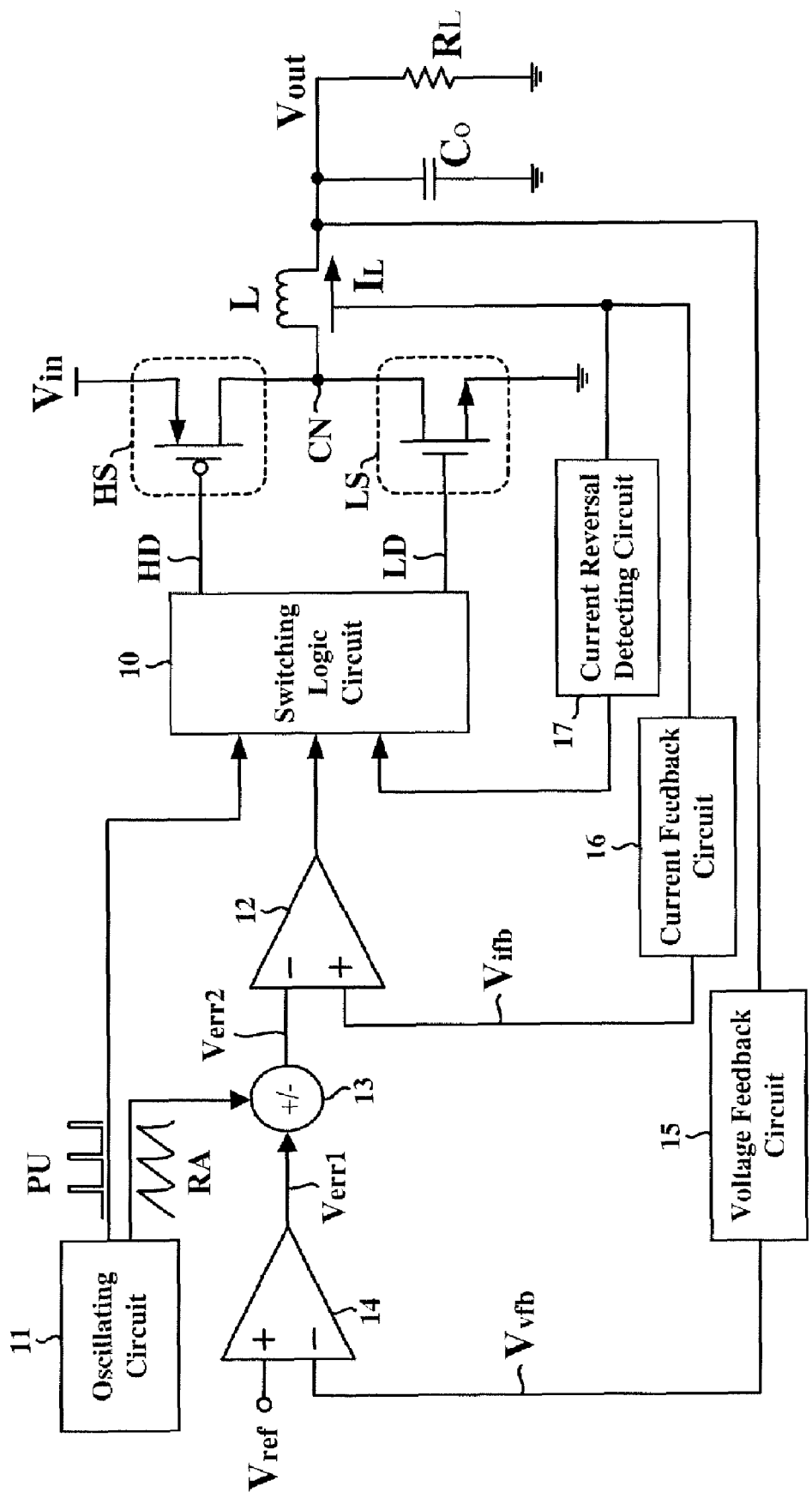
FIG. 1 is a circuit block diagram showing a conventional synchronous switching buck regulator with a current feedback control.
Figure 2:
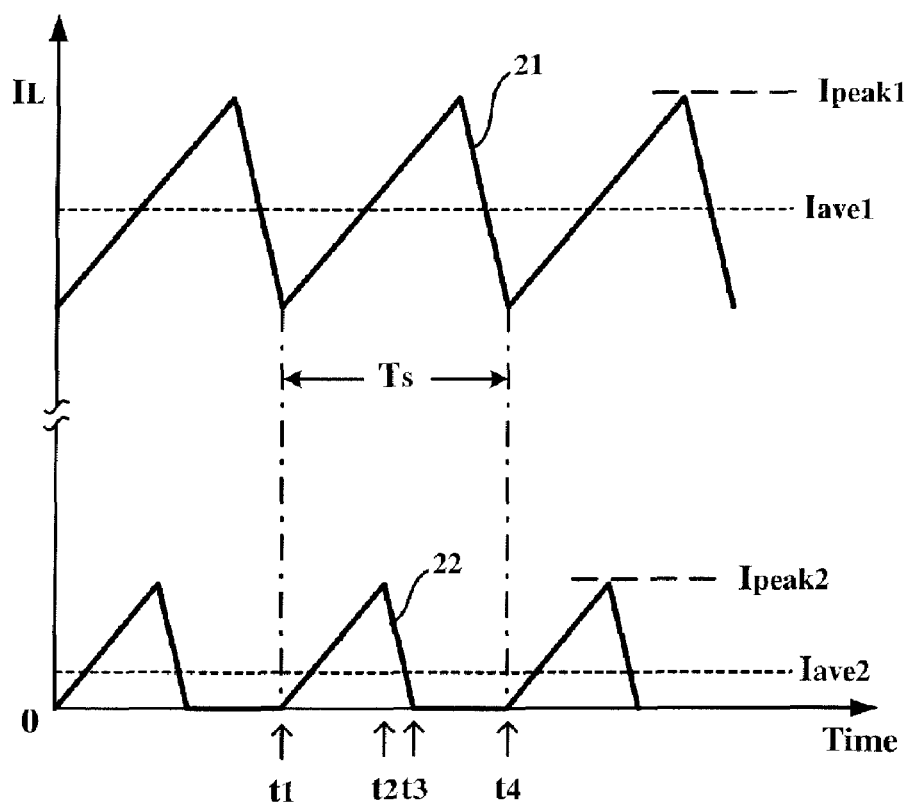
FIG. 2 is a timing chart showing waveforms of the inductor current with respect to continuous and discontinuous modes.
Figure 3:
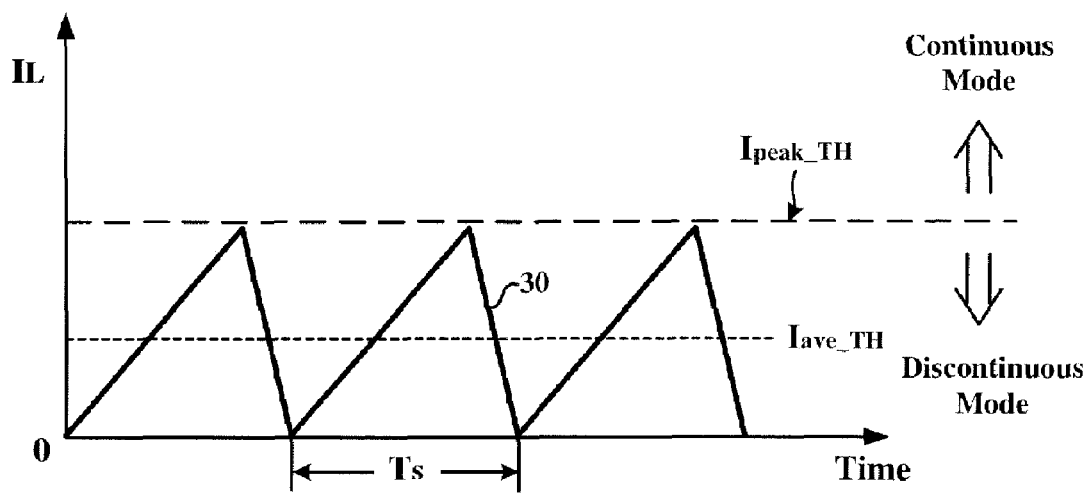
FIG. 3 is a timing chart showing a waveform of the inductor current with respect to a threshold operating state.

It is observed from FIG. 2 that the relationship between the peak current and the average current flowing through the inductor presents an essential difference between the continuous and discontinuous modes. More specifically, in the continuous mode indicated by the curve 21, the average current $I_{ave1}$ flowing through the inductor L is higher than half the peak current $I_{peak1}$ flowing through the inductor L. However, in the discontinuous mode indicated by the curve 22, the average current $I_{ave2}$ flowing through the inductor L is lower than half the peak current $I_{peak2}$ flowing through the inductor L because during one part of each switch period $T_S$ the inductor current $I_L$ is substantially equal to zero given that a current reversal preventing device is provided. Therefore, in order to avoid the discontinuous mode, half the peak current flowing through the inductor must be made lower than or equal to the average current flowing through the inductor. As shown in FIG. 3, a curve 30 indicates a waveform of the inductor current $I_L$ that reduces to zero immediately before the end of each switch cycle with respect to the threshold operating state. Through analytical calculation, the threshold peak current $I_{peak\_TH}$ is found to be determined cooperatively by the duty ratio D, the switch period $T_S$, the input voltage $V_{in}$, and the inductance L, as expressed in the following equation (1):

$$I_{peak\_TH} = \left(\frac{T_s}{L}\right) \cdot D \cdot (1-D) \cdot V_{in} \tag{1}$$

Since the threshold peak current $I_{peak\_TH}$ indicates the minimum allowable peak current of the continuous mode, the voltage regulator is effectively prevented from operating with the discontinuous mode if the peak current flowing through the inductor is made higher than or equal to the threshold peak current $I_{peak\_TH}$.

Figure 4:
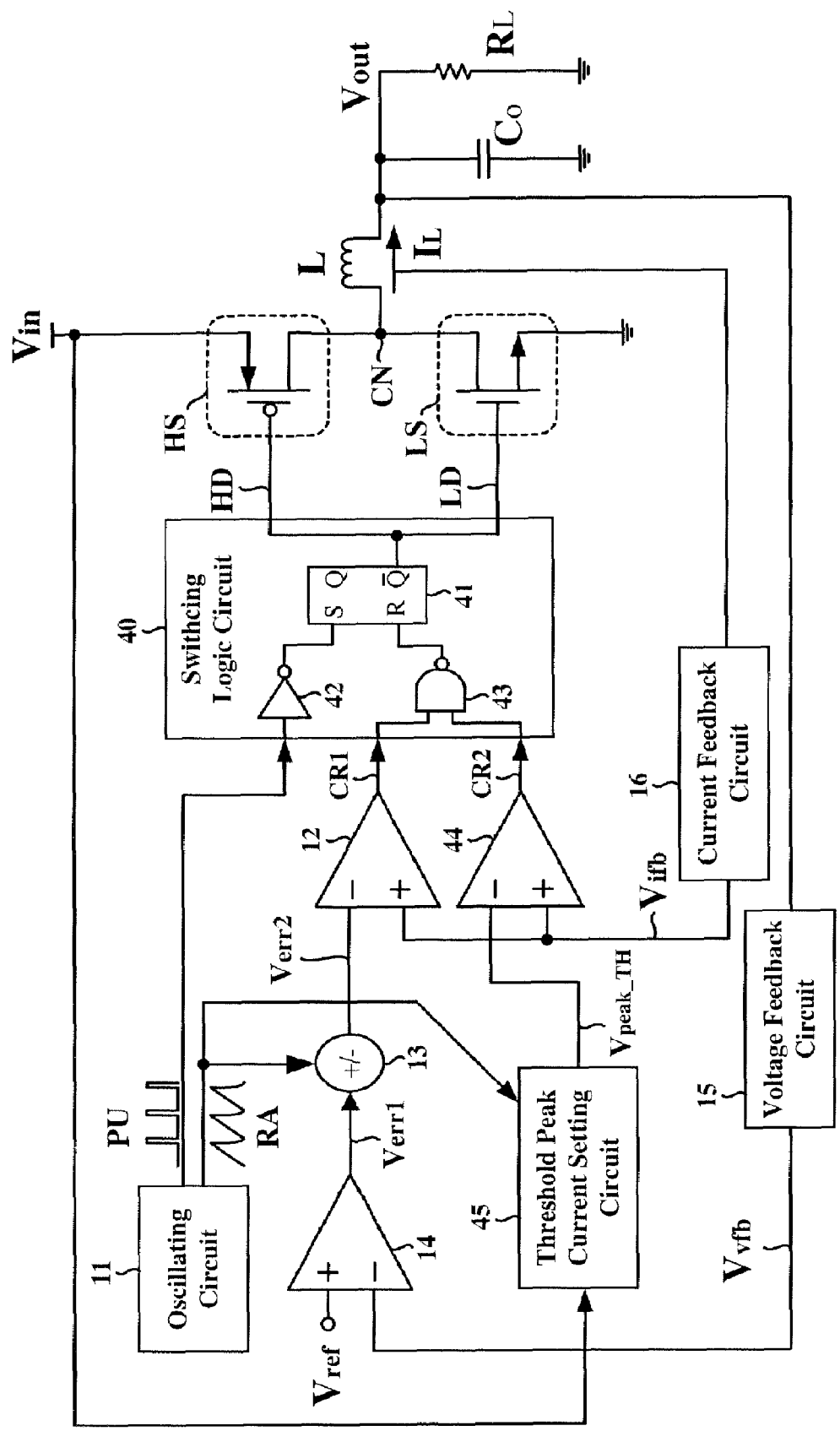
FIG. 4 is a circuit block diagram showing a synchronous switching buck regulator according to the present invention.

FIG. 4 is a circuit block diagram showing a synchronous switching buck regulator according to the present invention. As shown in FIG. 4, a high-side switch HS and a low-side switch LS are series-connected between an input voltage source $V_{in}$ and a ground potential. An inductor L has one end connected to the common node CN between the high-side switch HS and the low-side switch LS, and the other end serving as an output terminal for supplying an output voltage $V_{out}$ to a load $R_L$. The output terminal may be additionally provided with an output capacitor $C_o$ for filtering the output voltage $V_{out}$. The high-side switch HS and the low-side switch LS are controlled by a high-side drive signal HD and a low-side drive signal LD generated from a switching logic circuit 40, respectively. The switching logic circuit 40 has an SR latch 41 for supplying the high-side drive signal HD and the low-side drive signal LD from the inverting output terminal $\overline{Q}$. In the embodiment shown in FIG. 4, the high-side switch HS and the low-side switch LS are implemented by signals with the same phase because the high-side switch HS is implemented by a PMOS transistor and the low-side switch LS is implemented by an NMOS transistor.

The SR latch 41 has a set terminal S connected to an output terminal of an inverter 42. The inverter 42 has an input terminal connected to an oscillating circuit 11 for receiving a pulse signal PU. The SR latch 41 has a reset terminal R connected to an output terminal of an NAND gate 43. The NAND gate 43 has a first input terminal connected to an output terminal of a comparator 12 for receiving a first comparison result signal CR1. The comparator 12 has an inverting input terminal connected to an output terminal of a slope compensation circuit 13. The slope compensation circuit 13 has two input terminals connected to the oscillating circuit 11 and an output terminal of an error amplifier 14, respectively, for generating a slope-compensated error signal $V_{err2}$ in accordance with a ramp signal RA output from the oscillating circuit 111 and the error signal $V_{err1}$, between a voltage feedback signal $V_{vfb}$ and a reference voltage signal $V_{ref}$, output from the error amplifier 14. The error amplifier 14 has an inverting input terminal connected to an output terminal of a voltage feedback circuit 15 for receiving the voltage feedback signal $V_{vfb}$ representative of the output voltage $V_{out}$ of the switching voltage regulator. The error amplifier 14 has a non-inverting input terminal for receiving the reference voltage signal $V_{ref}$. The comparator 12 has a non-inverting input terminal connected to a current feedback circuit 16 for receiving a current feedback signal $V_{ifb}$ representative of the inductor current $I_L$.

The NAND gate 43 has a second input terminal connected to an output terminal of a comparator 44 for receiving a second comparison result signal CR2. The comparator 44 has an inverting input terminal connected to a threshold peak current setting circuit 45 for receiving a threshold signal $V_{peak\_TH}$. The comparator 44 has a non-inverting input terminal connected to the current feedback circuit 16 for receiving the current feedback signal $V_{ifb}$. The threshold signal $V_{peak\_TH}$ generated by the threshold peak current setting circuit 45 is representative of the threshold peak current $I_{peak\_TH}$ calculated in accordance with the equation (1) described above.

Hereinafter is described in detail the operation of the synchronous switching buck regulator according to the present invention with reference to FIG. 4. The pulse signal PU having a period $T_S$ generated by the oscillating circuit 11 is supplied through the inverter 42 to the set terminal S of the SR latch 41. Since the SR latch 41 is a negative-going trigger circuit, the rising edge of the pulse signal PU after inverted triggers the SR latch 41 such that the inverting output terminal $\overline{Q}$ supplies the high-side drive signal HD and the low-side drive signal LD with the LOW level for staring a switch cycle. The high-side drive signal HD with the LOW level turns on the high-side switch HS while the low-side drive signal LD with the LOW level turns off the low-side switch LS. As a result the input voltage source $V_{in}$ supplies energy to the inductor L for linearly increasing the inductor current $I_L$. The current feedback circuit 16 detects the inductor current $I_L$ and then generates the current feedback signal $V_{ifb}$ representative of the inductor current $I_L$. The current feedback signal $V_{ifb}$ is supplied to the comparators 12 and 44 for being compared respectively with the slope-compensated error signal $V_{err2}$ and the threshold signal $V_{peak\_TH}$.

With the function of the comparator 12, the first comparison result signal CR1 immediately changes from the LOW level to the HIGH level once the current feedback signal $V_{ifb}$ linearly increases in excess of the slope-compensated error signal $V_{err2}$. On the other hand, with the function of the comparator 44, the second comparison result signal CR2 immediately changes from the LOW level to the HIGH level once the current feedback signal $V_{ifb}$ linearly increases in excess of the threshold signal $V_{peak\_TH}$. The first and second comparison result signals CR1 and CR2 are coupled through the NAND gate 43 for controlling the reset terminal R of the SR latch 41. Therefore, the reset terminal R is triggered (i.e. the output signal of the NAND gate 43 changes from the HIGH level to the LOW level) under a condition that both of the first and second comparison result signals CR1 and CR2 must have the HIGH level. In other words, when the current feedback signal $V_{ifb}$ is below the threshold signal $V_{peak\_TH}$, the output signal of the NAND gate 43 is kept HIGH and incapable of triggering the reset terminal R to the LOW level of the second comparison result signal CR2, even if the current feedback signal $V_{ifb}$ has already linearly increased in excess of the slope-compensated error signal $V_{err2}$ to trigger the first comparison result signal CR1 from the LOW level to the HIGH level. As a result, the high-side switch HS stays conductive for allowing the current feedback signal $V_{ifb}$ to linearly increase in excess of the threshold signal $V_{peak\_TH}$.

When the reset terminal R is triggered the inverting output terminal $\overline{Q}$ of the SR latch 41 supplies the high-side drive signal HD and low-side drive signal LD with the HIGH level. The high-side drive signal HD with the HIGH level turns off the high-side switch HS while the low-side drive signal LD with the HIGH level turns on the low-side switch LS. As a result, the energy stored in the inductor L delivers to the load $R_L$ for linearly decreasing the inductor current $I_L$. Since the peak current flowing through the inductor L must become higher than or equal to the threshold peak current $I_{peak\_TH}$ for triggering the reset terminal R, the inductor current $I_L$ are effectively prevented from decreasing to reverse polarity before the pulse signal PU triggers the set terminal S again to start the next switch cycle. Therefore, the synchronous switching buck regulator according to the present invention operates without a discontinuous mode and avoids the problems caused by the inductor current reversal and/or the high-frequency fluctuation of the output voltage.

In the embodiment shown in FIG. 4, since the comparators 12 and 44 are designed as the voltage-type comparators for receiving the voltage-type input signals and supplying the voltage-type output signals, the current feedback circuit 16 and the threshold peak current setting circuit 45 are designed to output the voltage-type signals $V_{ifb}$ and $V_{peak\_TH}$ for indirectly corresponding to the physical quantity $I_L$ and $I_{peak\_TH}$, instead of directly outputting current-type signals. It should be noted that the present invention is applicable to a case where the current feedback circuit 16 and the threshold peak current setting circuit 45 are designed to directly output the current-type signals. For example, current-to-voltage converters are additionally provided to the output terminals of the current feedback circuit 16 and the threshold peak current setting circuit 45 for converting the current-type signals to the voltage-type signals. Alternatively, voltage-to-current converter is employed to convert the voltage-type error signal $V_{err2}$ to the current-type signal while the comparators 12 and 44 are designed as the current-type comparator circuits. In this case, the current feedback circuit 16 and the threshold peak current setting circuit 45 may be designed to directly output the current-type signals.

As clearly seen from the equation (1), the threshold signal $V_{peak\_TH}$ is a parabolic function of the duty ratio. Except for the establishment of the steady state, the duty ratio varies in accordance with the real-time operation of the switching voltage regulator. Even in the steady state the duty ratio may need to increase for maintaining the output voltage $V_{out}$ at the desired value due to a drop of the input voltage source $V_{in}$. Therefore, the threshold peak current setting circuit 45 according to the present invention must adjust the threshold signal $V_{peak\_TH}$ in accordance with the real-time operation of the switching voltage regulator, rather than generates a fixed signal to serve as the threshold signal $V_{peak\_TH}$.

Figure 5:
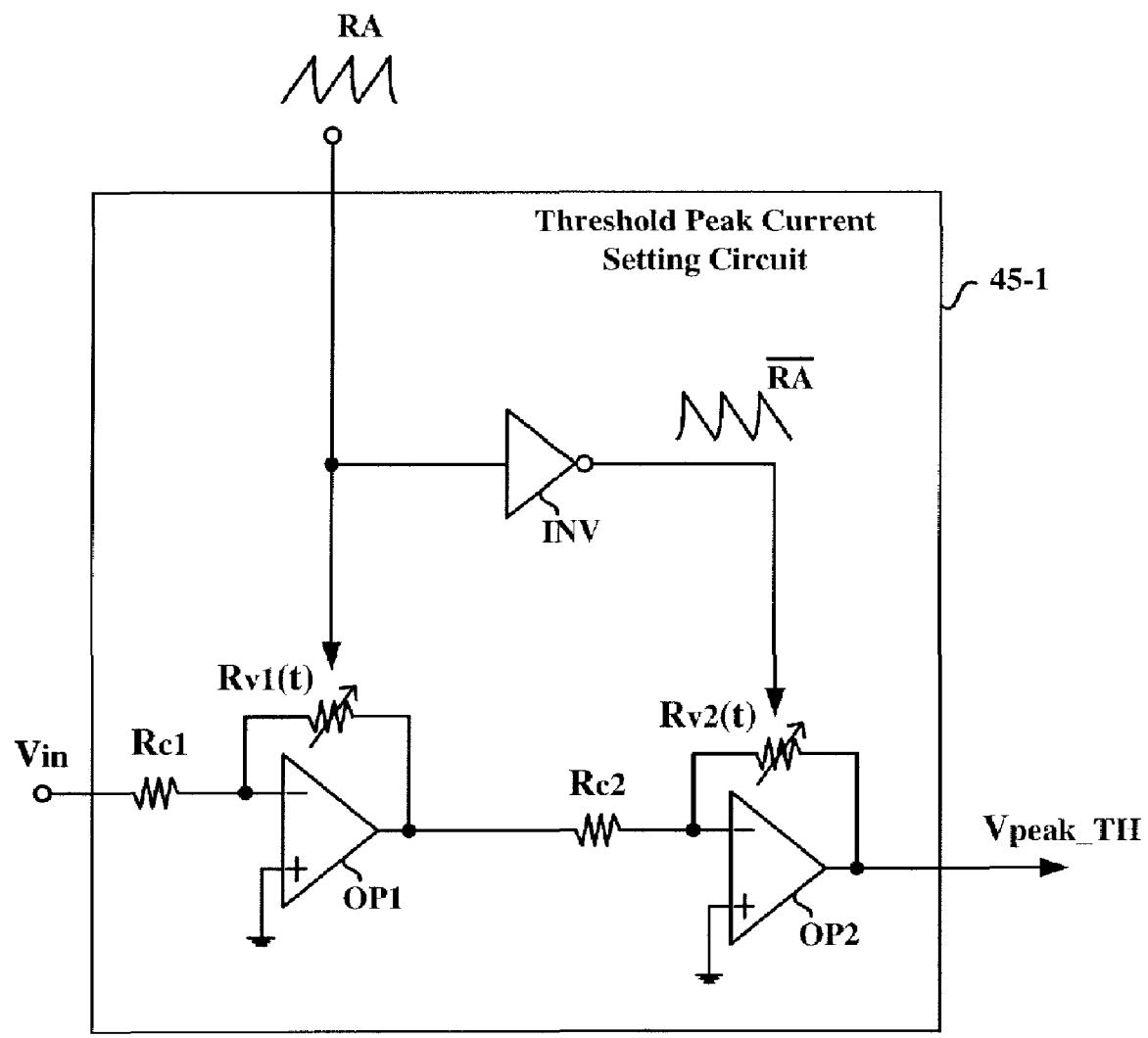
FIG. 5 is a detailed circuit diagram showing a first example of a threshold peak current setting circuit according to the present invention.

FIG. 5 is a detailed circuit diagram showing a first example of a threshold peak current setting circuit 45-1 according to the present invention. As shown in FIG. 5, in response to the unregulated input voltage Vin and the ramp signal RA having the period $T_S$, the threshold peak current setting circuit 45-1 generates the threshold signal $V_{peak\_TH}$ representative of the threshold peak current $I_{peak\_TH}$ calculated in accordance with the equation (1) described above. More specifically, the input voltage $V_{in}$ is linearly amplified through operating amplifiers OP1 and OP2 in sequence to form the threshold signal $V_{peak\_TH}$, which may be expressed as the following equation (2):

$$V_{peak\_TH} = \left(\frac{R_{v1}}{R_{c1}}\right) \cdot \left(\frac{R_{v2}}{R_{c2}}\right) \cdot V_{in} \quad (2)$$

wherein $R_{c1}$ is a constant resistance connected between the input voltage $V_{in}$ and an inverting input terminal of the operating amplifier OP1, $R_{v1}$ is a linearly variable resistance connected between the inverting input terminal and an output terminal of the operating amplifier OP1, $R_{c2}$ is a constant resistance connected between the input voltage $V_{in}$ and an inverting input terminal of the operating amplifier OP2, and $R_{v2}$ is a linearly variable resistance connected between the inverting input terminal and an output terminal of the operating amplifier OP2.

The linearly variable resistance $R_{v1}$ is designed as a time-argument function that may be expressed as the following equation (3):

$$R_{v1}(t) = R_{v1,t=0} \cdot D(t) \quad (3)$$

wherein $R_{v1,t=0}$ is an initial value of the linearly variable resistance $R_{v1}$ in the beginning of the switch cycle and D(t) is a time-argument function whose value linearly increases from zero to one over the period $T_S$. The linearly variable resistance $R_{v2}$ is designed as another time-argument function that may be expressed as the following equation (4):

$$R_{v2}(t) = R_{v2,t=0} \cdot (1-D)(t) \quad (4)$$

wherein $R_{v2,t=0}$ is an initial value of the linearly variable resistance $R_{v2}$ in the beginning of the switch cycle and (1−D)(t) is a time-argument function whose value linearly decreases from one to zero over the period $T_S$. The oscillating circuit 11 shown in FIG. 4 generates the ramp signal RA having amplitude that linearly increases over the period $T_S$. Consequently, the linearly variable resistance $R_{v1}$ may be modulated in response to the ramp signal RA generated from the oscillating circuit 11. On the other hand, the ramp signal RA becomes an inverted waveform through an inverter INV to cause its amplitude to linearly decrease over the period $T_s$. Consequently, the linearly variable resistance $R_{v2}$ may be modulated in response to the inverted ramp signal.

By substituting the equations (3) and (4) for the equation (2), the threshold signal $V_{peak\_TH}$ may be expressed as the following equation (5):

$$V_{peak\_TH}(t) = \left(\frac{R_{v1,t=0}}{R_{c1}}\right) \cdot \left(\frac{R_{v2,t=0}}{R_{c2}}\right) \cdot D(t) \cdot (1-D)(t) \cdot V_{in} \quad (5)$$

Comparing the equations (1) and (5), it is found that the proportional coefficient made up of the resistances must be designed to satisfy the following condition (6):

$$\left(\frac{R_{v1,t=0}}{R_{c1}}\right) \cdot \left(\frac{R_{v2,t=0}}{R_{c2}}\right) = \frac{T_s}{L} \quad (6)$$

During each switch cycle, the threshold signal $V_{peak\_TH}$ corresponding to this very moment when the current feedback signal $V_{ifb}$ reaches the slope-compensated error signal $V_{err2}$ is precisely generated from the threshold peak current setting circuit 45-1. As a result, the comparator 44 effectively determines whether the current feedback signal $V_{ifb}$ reaches the threshold signal $V_{peak\_TH}$ or not, thereby avoiding operating the switching voltage regulator with the discontinuous mode.

Figure 6:
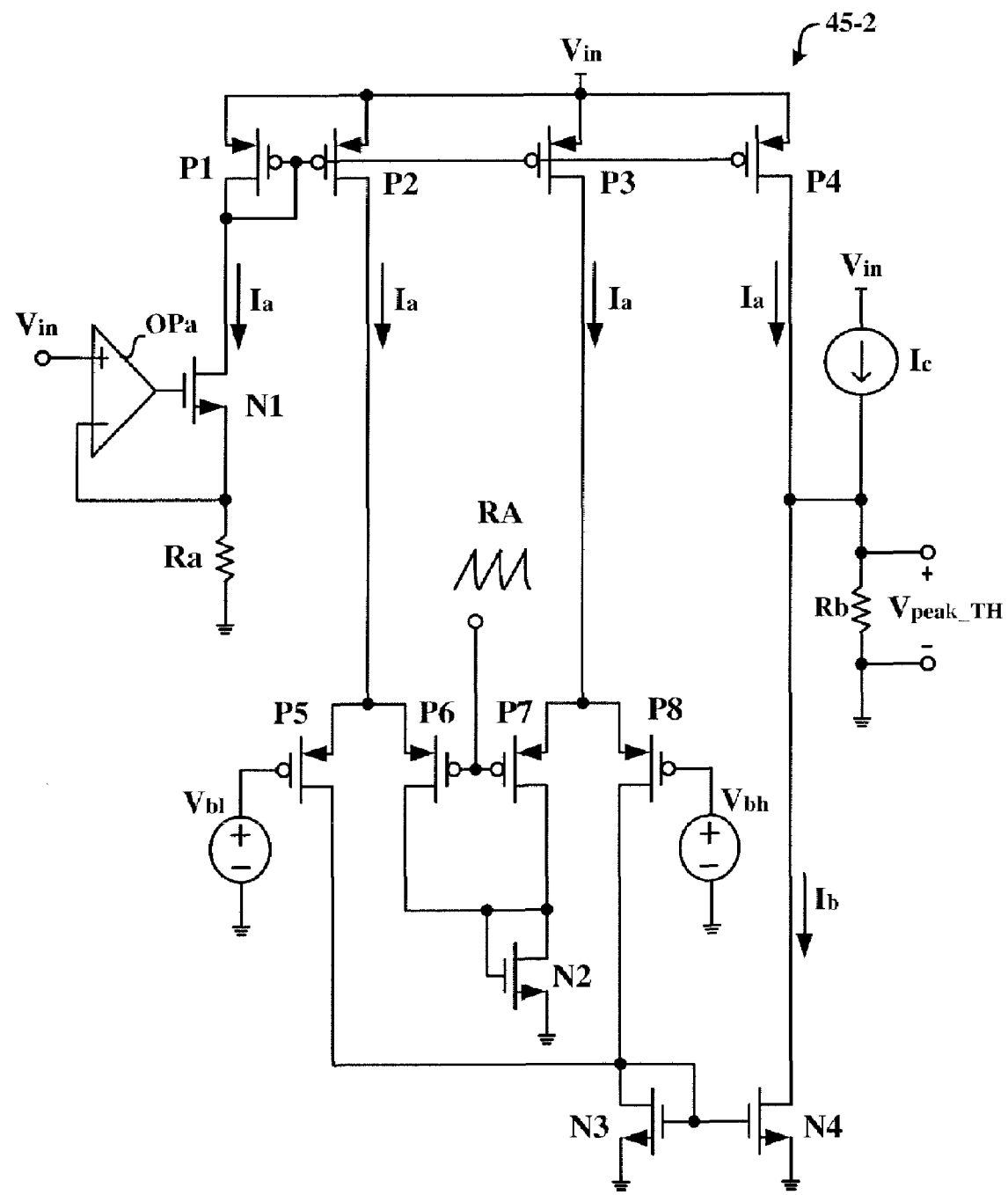
FIG. 6 is a detailed circuit diagram showing a second example of a threshold peak current setting circuit according to the present invention.

FIG. 6 is a detailed circuit diagram showing a second example of a threshold peak current setting circuit 45-2 according to the present invention. As shown in FIG. 6, the input voltage $V_{in}$ determines a current $I_a$ through a linear current regulator constructed of an operating amplifier $OP_a$, an NMOS transistor N1, and a resistance $R_a$, which may be expressed as the following equation (7):

$$I_a = \left(\frac{V_{in}}{R_a}\right) \quad (7)$$

In other words, the current $I_a$ is proportional to the input voltage $V_{in}$. PMOS transistors P1 to P4 form a current mirror with the multiple output stages P2 to P4 for supplying the current $I_a$. The transistor P2 supplies the current $I_a$ to a differential pair constructed of PMOS transistors P5 and P6. The transistor P3 supplies the current $I_a$ to another differential pair constructed of PMOS transistors P7 and P8. The transistor P5 has a gate electrode controlled by a low-boundary reference voltage $V_{bl}$ while the transistor P8 has a gate electrode controlled by a high-boundary reference voltage $V_{bh}$. The transistors P6 and P7 have their gate electrodes connected together for receiving the ramp signal RA generated from the oscillating circuit 11.

The current $I_a$ supplied from the transistor P3 is distributed to the transistor P5 in accordance with a difference between the low-boundary reference voltage $V_{bl}$ and the ramp signal RA. In other words, the differential pair constructed of the transistors P5 and P6 is controlled by the low-boundary reference voltage $V_{bl}$ and the ramp signal RA for allowing a periodically-varying component of the current $I_a$ to flow through the transistor P5 in accordance with the variation of the ramp signal RA. The current $I_a$ supplied from the transistor P4 is distributed to the transistor P8 in accordance with a difference between the ramp signal RA and the high-boundary reference voltage $V_{bh}$. In other words, the differential pair constructed of the transistors P7 and P8 is controlled by the ramp signal RA and the high-boundary reference voltage $V_{bh}$ for allowing a periodically-varying component of the current $I_a$ to flow through the transistor P8 in accordance with the variation of the ramp signal RA. Subsequently, the periodically-varying components flowing through the transistors P5 or P8 are combined together and then converted to a current $I_b$ by a current mirror constructed of NMOS transistors N3 and N4.

The threshold signal $V_{peak\_TH}$ is implemented by a potential difference across a resistance Rb through which the currents $I_a$, $I_b$, and $I_c$ flows, which may be expressed as the following equation (8):

$$V_{peak\_TH} = (I_a - I_b + I_c) \cdot R_b \quad (8)$$

The current $I_a$ is generated to approximately simulate the variation of the input voltage $V_{in}$ in the equation (1). Since the current $I_b$ changes in response to the current $I_a$ and the ramp signal RA, the current $I_b$ is suitable for approximately simulating the variation of the threshold signal $V_{peak\_TH}$ caused by the duty ratio D and the input voltage $V_{in}$. The current $I_c$ is a constant offset current for shifting a DC level of the threshold signal $V_{peak\_TH}$. In one embodiment of the present invention, the low-boundary reference voltage $V_{bl}$ is set at 0.5 volts, the high-boundary reference voltage $V_{bh}$ is set at 0.75 volts, and the ramp signal RA is set to linearly change from 0 volt to 0.8 volts. Under such parameters, the combination of the currents $I_a$, $I_b$, and $I_c$ expressed in the equation (8) is able to approximately simulate the threshold signal $V_{peak\_TH}$ under the situation that the duty ratio D is between 0.66 and 1.

Figure 7:
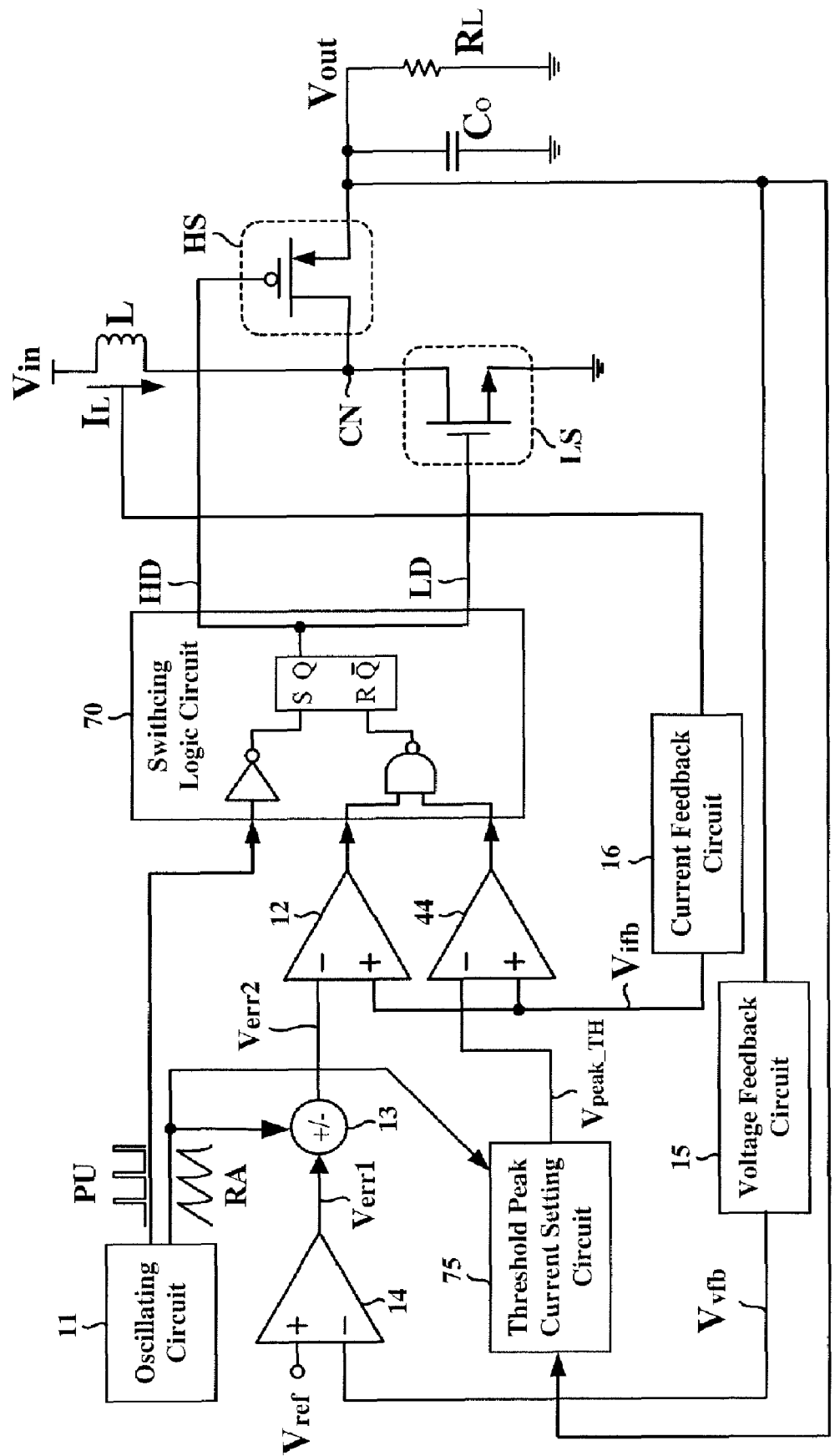
FIG. 7 is a circuit block diagram showing a synchronous switching boost regulator according to the present invention.

It is should be noted that the circuitry and method according to the present invention is not limited to the preferred embodiment described above and can be widely applied to various topologies of switching voltage regulators, such as synchronous or non-synchronous, boost or buck, voltage feedback control or current feedback control, pulse width modulation (PWM) or pulse frequency modulation (PFM), and the like. FIG. 7 is a circuit block diagram showing a synchronous switching boost regulator according to the present invention. The boost regulator of FIG. 7 is different from the buck regulator of FIG. 4 in the connection relationship between the high-side switch HS and the inductor L, a switching logic circuit 70, and a threshold peak current setting circuit 75. As shown in FIG. 7, the inductor L is connected between the input voltage $V_{in}$ and the common node CN while the high-side switch HS is connected between the common node CN and the output terminal. The switching logic circuit 70 supplies the high-side drive signal HD and the low-side drive signal LD through the normal output terminal Q of the SR latch. The threshold peak current setting circuit 75 generates the threshold signal $V_{peak\_TH}$ representative of the threshold peak current $I_{peak\_TH}$ flowing through the inductor L, which may be expressed as the following equation (9):

$$I_{peak\_TH} = \left(\frac{T_s}{L}\right) \cdot D \cdot (1-D) \cdot V_{out} \quad (9)$$

Comparing the equations (9) and (1), it is found that the output voltage term $V_{out}$ of the equation (9) corresponds to the input voltage term $V_{in}$ of the equation (1). Therefore, the threshold peak current setting circuit 75 applied to the boost regulator determines the threshold signal $V_{peak\_TH}$ in response to the output voltage $V_{out}$ and the ramp signal RA generated from the oscillating circuit 11. More specifically, it is easy to obtain the threshold peak current setting circuit 75 applicable to the boost regulator of FIG. 7 if the output voltage $V_{out}$ is substituted for the input voltage $V_{in}$ of the threshold peak current setting circuit 45-1 shown in FIG. 5 or the threshold peak current setting circuit 45-2.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A switching voltage regulator for converting an input voltage to an output voltage, comprising:
    a switching circuit operating with a first operating state and a second operating state such that the switching circuit allows a switching current to linearly increase during the first operating state and allows the switching current to linearly decrease during the second operating state;
    a control circuit coupled to the switching circuit for controlling the switching circuit to operate with the first operating state or the second operating state; and
    a setting circuit for generating a threshold signal,
    wherein the control circuit comprises:
        a voltage feedback circuit for generating a voltage feedback signal representative of the output voltage;
        a current feedback circuit for generating a current feedback signal representative of the switching current;
        an error amplifier for generating an error signal representative of a difference between the voltage feedback signal and a reference voltage signal;
        a first comparing circuit for comparing the current feedback signal and the error signal so as to generate a first comparison result signal;
        a second comparing circuit for comparing the current feedback signal and the threshold signal to generate a second comparison result signal; and
        a logic circuit for receiving the first and the second comparison result signals so as to generate a trigger signal in response to logical coupling between the first and the second comparison result signals,
    wherein the control circuit is triggered by the trigger signal to operate the switching circuit with the second operating state when the current feedback signal during the first operating state becomes higher than a larger one of the error signal and the threshold signal.

2. The switching voltage regulator according to claim 1, further comprising:
    an inductor connected to the switching circuit such that the switching current flows through the inductor.

3. The switching voltage regulator according to claim 2, further comprising:
    an input voltage source for supplying the input voltage to the inductor to linearly increase the switching current during the first operating state.

4. The switching voltage regulator according to claim 1, further comprising:
    an oscillating circuit for generating a pulse signal and a ramp signal such that the control circuit in response to the pulse signal controls the switching circuit to operate with the first operating state, and the setting circuit in response to the ramp signal adjusts the threshold signal.

5. The switching voltage regulator according to claim 1, wherein:
    the setting circuit adjusts the threshold signal in response to at least a duty ratio of the switching circuit.

6. The switching voltage regulator according to claim 1, wherein:
    the setting circuit adjusts the threshold signal in response to at least a period of time spent by the switching circuit operating with the first operating state.

7. The switching voltage regulator according to claim 1, wherein:
    the output voltage is smaller than the input voltage, and the setting circuit adjusts the threshold signal in response to at least the input voltage.

8. The switching voltage regulator according to claim 1, wherein:
    the output voltage is larger than the input voltage, and the setting circuit adjusts the threshold signal in response to at least the output voltage.

9. The switching voltage regulator according to claim 1, wherein:
    the setting circuit comprises:

a linear current regulator for generating a current signal representative of the input voltage;

a first differential pair controlled by a periodic signal and a low-boundary reference voltage signal for selecting a first component from the current signal;

a second differential pair controlled by the periodic signal and a high-boundary reference voltage signal for selecting a second component from the current signal; and a constant current source for supplying an offset current signal, wherein:

the threshold signal is approximately simulated by a combination of the current signal, the first component, the second component, and the offset current signal.

10. The switching voltage regulator according to claim 9, further comprising:

an oscillating circuit for generating a pulse signal and a ramp signal such that the control circuit in response to the pulse signal controls the switching circuit to operate with the first operating state, and the periodic signal is implemented by the ramp signal.

11. A method of controlling a switching voltage regulator for converting an input voltage to an output voltage, comprising steps of:

generating an error signal, representative of a difference between the output voltage and a reference voltage signal, for determining a first current value;

setting a threshold signal for determining a second current value;

controlling a switching circuit to operate with a first operating state for allowing a switching current to linearly increase;

comparing the switching current and the error signal so as to generate a first comparison result signal;

comparing the switching current and the threshold signal so as to generate a second comparison result signal;

logically coupling the first and the second comparison result signals so as to generate a trigger signal indicating that the switching current is higher or equal to a larger one of the first and the second current values; and controlling the switching circuit to operate with a second operating state in response to the trigger signal, for allowing the switching current to linearly decrease, thereby preventing the switching current from linearly decreasing to reverse polarity in the step of controlling the switching circuit to operate with the second operating state.

12. The method according to claim 11, wherein:
the output voltage is larger than the input voltage, and
the threshold signal is adjusted in accordance with at least the output voltage.

13. The method according to claim 11, wherein:
the output voltage is smaller than the input voltage, and
the threshold signal is adjusted in accordance with at least the input voltage.

14. The. method according to claim 11, wherein:
the threshold signal is adjusted in accordance with at least a period of time spent for the step of controlling the switching circuit to operate with the first operating state.

15. A switching voltage regulator for converting an input voltage to an output voltage, comprising:

a switching circuit operating alternately with a first operating state and a second operating state such that the switching circuit allows a switching current to linearly increase during the first operating state and allows the switching current to linearly decrease during the second operating slate;

an error amplifier for generating an error signal representative of a difference between the output voltage and a reference voltage signal, wherein the error signal determines a first current value;

a setting circuit for generating a threshold signal, wherein the threshold signal determines a second current value; and a control circuit for operating the switching circuit with the first operating state until the switching current is higher than or equal to a larger one of the first and the second current values, thereby preventing the switching current from linearly decreasing to reverse polarity during the second operating state, wherein the control circuit comprises:

a first comparing circuit for comparing the switching current and the error signal so as to generate a first comparison result signal;

a second comparing circuit for comparing the switching current and the threshold signal so as to generate a second comparison result signal; and a logic circuit for receiving the first and the second comparison result signals so as to generate a trigger signal in response to logical coupling of the first and the second comparison result signals, such that the control circuit is triggered by the trigger signal to operate the switching circuit with the second operating state.

16. The switching voltage regulator according to claim 15, wherein:

the setting circuit comprises:

a linear current regulator for generating a current signal representative of the input voltage;

a first differential pair controlled by a periodic signal and a low-boundary reference voltage signal for selecting a first component from the current signal;

a second differential pair controlled by the periodic signal and a high-boundary reference voltage signal for selecting a second component from the current signal; and a constant current source for supplying an offset current signal, wherein:

the threshold signal is approximately simulated by a combination of the current signal, the first component, the second component, and the offset current signal.

17. The switching voltage regulator according to claim 15, wherein:

the setting circuit adjusts the threshold signal in response to at least a duty ratio of the switching circuit.

18. The switching voltage regulator according to claim 15, wherein:

the setting circuit adjusts the threshold signal in response to at least a period of time spent by the switching circuit operating with the first operating state.

19. The switching voltage regulator according to claim 15, further comprising:

an oscillating circuit for generating a pulse signal and a ramp signal such that the control circuit in response to the pulse signal controls the switching circuit to operate with the first operating state, and the setting circuit in response to the ramp signal adjusts the threshold signal.

* * * * *